United States Patent [19]

Oliphant

[11] Patent Number: 4,543,598
[45] Date of Patent: Sep. 24, 1985

[54] COLOR TELEVISION SYSTEMS
[75] Inventor: Andrew Oliphant, Reigate, England
[73] Assignee: British Broadcasting Corporation, London, England
[21] Appl. No.: 395,886
[22] Filed: Jul. 7, 1982
[30] Foreign Application Priority Data Jul. 9, 1981 [GB] United Kingdom ............... 8121212

[51] Int. Cl.$^4$ .............................................. H04N 9/42
[52] U.S. Cl. ........................................ 358/11; 358/12
[58] Field of Search ....................... 358/11, 12, 15, 16
[56] References Cited
FOREIGN PATENT DOCUMENTS 1512595  5/1969  Fed. Rep. of Germany .
852512  10/1960  United Kingdom ................. 358/16
1007432  10/1965  United Kingdom .
1482079  8/1977  United Kingdom .

*Primary Examiner*—Richard Murray
*Attorney, Agent, or Firm*—Robert F. O'Connell

[57] ABSTRACT

In a color television system the luminance signal is split into high and low frequency components, and the high-frequency luminance components are frequency shifted to above the conventional television bandwidth. A conventional receiver uses the low-frequency luminance components ($Y_1$) and the chrominance component (C), with no cross effects between them. A high-quality receiver can be constructed to recombine the low-frequency and high-frequency luminance components ($Y_1$ and $Y_2'$) giving improved luminance detail, again without cross effects with the chrominance signal. The sound signal (S) is carried between the chrominance and high-frequency luminance. A transmitter (FIG. 4) and receiver (FIG. 5) are described. The system has particular applicability to satellite and cable television.

23 Claims, 6 Drawing Figures

COLOR TELEVISION SYSTEMS

BACKGROUND OF THE INVENTION

This invention is concerned with colour television systems.

In the existing broadcast television standards, when colour pictures are transmitted, the colour information is modulated onto a subcarrier within the luminance band. The chrominance and luminance signals thus share the same frequency space, so there can be crosstalk between them. To reduce this crosstalk, most receivers restrict the bandwidths of both chrominance and luminance signals. Thus receiver design involves a compromise between four impairments:

(i) crosscolour, the demodulation of high frequency luminance as spurious chrominance patterns;
(ii) crossluminance, the high frequency luminance pattern resulting from imperfect suppression of the chrominance subcarrier
(iii) reduction of luminance resolution; and
(iv) reduction of the chrominance resolution.

FIG. 1 shows three frequency spectra in a conventional television system. FIG. 1(a) shows the spectrum of a conventional PAL signal by way of example. The luminance signal spectrum extends to a maximum video frequency $f_v$ which in the UK System I is 5.5 MHz, but the upper part of the band is shared with modulated chrominance signals, as shown by the cross-hatched portion. A conventional receiver has an i.f. filter characteristic which falls off towards high frequencies, and a notch filter to attenuate plain area subcarrier at the subcarrier frequency $f_{sc}$ which would cause crossluminance. Thus the displayed luminance characteristic is similar to FIG. 1(b), where the cross-hatched area indicates the part of the spectrum affected by crossluminance. Similarly the receiver incorporates a chrominance bandpass filter giving a modulated chrominance spectrum similar to FIG. 1(c). The whole of this area is affected by crosscolour.

A demand now exists for a broadcast television system of higher quality than the conventional standards. The introduction of satellite broadcasting and cable television would permit the improvement of broadcasting standards and in particular would reduce the importance of transmitting the whole signal within the existing bandwidth.

It has been proposed to repeat the modulated chrominance signal at an out-of-band frequency. A high-quality receiver would use this out-of-band chrominance signal in place of the in-band chrominance components. In this way the high-quality receiver would not suffer from crosscolour. A normal receiver would simply ignore the out-of-band signal and would receive a conventional signal.

SUMMARY OF THE INVENTION

However I have appreciated that an improved system can be produced by transmitting instead the high-frequency luminance components outside the conventional colour television signal bandwidth. In this way objectionable crossluminance can be avoided in a high-quality receiver.

In accordance with this invention, in a colour television system such as the PAL or NTSC system, high-frequency luminance components are separated out and frequency-shifted for transmission above the conventional video-signal bandwith. These shifted high-frequency components could be transmitted as well as the conventional in-band high frequency components, but preferably the in-band signal does not include those high-frequency luminance components which are transmitted out of band, and in this way crosscolour is also avoided.

I have appreciated that with such a preferred system a conventional receiver will still give a picture quality which is subjectively as good as at present. As described above, the existing receivers generally make no substantial use of the high-frequency luminance components, so their loss will hardly be noticed from the luminance signal. However, the reduction in crosscolour caused by the absence of these luminance components will be noticeable and will improve the picture quality.

BRIEF DESCRIPTION OF THE DRAWINGS

The invention will now be described in more detail by way of example with reference to the drawings, in which.

DETAILED DESCRIPTION OF THE PREFERRED EMBODIMENT OF THE INVENTION

The following description will be related to the colour television system in use in the United Kingdom, namely PAL System I, but the invention is applicable to other colour television systems in which the chrominance information is currently transmitted on a subcarrier in the higher part of the luminance frequency band. This of course includes the NTSC system.

The system to be described allocates separate frequency bands for luminance and chrominance. However, this is done in such a way as to retain compatibility of the new signal with existing receivers. Existing receivers will display a picture with resolution substantially as at present, but with crosscolour and crossluminance almost completely eliminated.

The system furthermore permits the use of new receivers which are able to reconstitute a signal to provide a high-quality picture with greater resolution of the luminance signal (to a frequency of 5.5 MHz with present standards) and resolution of chrominance to about 2 MHz, without crosstalk effects. This gives a resolution for both luminance and chrominance which is considerably greater than that achieved with present receivers.

Figure 1:
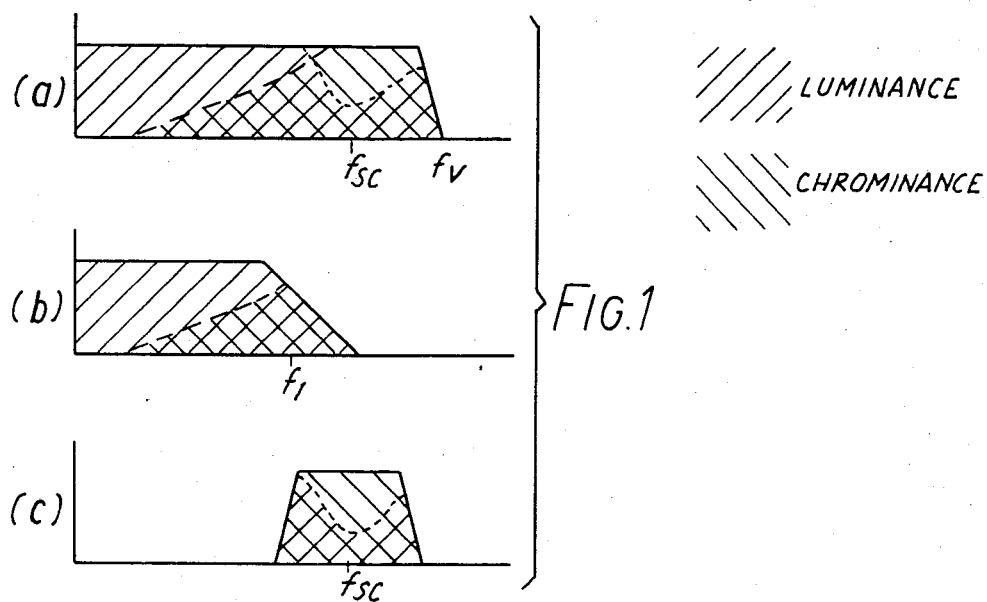
FIG. 1 (described above) shows frequency spectra of (a) a conventional PAL signal as transmitted, (b) the luminance channel response of a conventional receiver and (c) the chrominance channel response of a conventional receiver.
Figure 2:
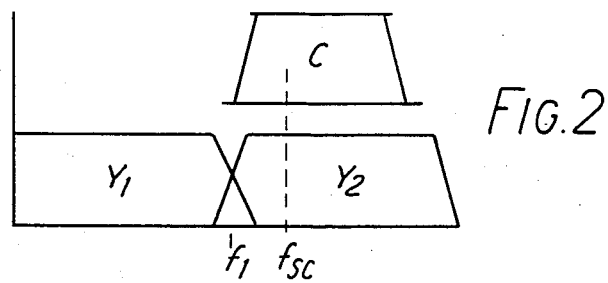
FIG. 2 illustrates on a frequency diagram the signal components available for transmission in a system embodying the invention.

In the system described below, the luminance spectrum is split into low frequency ($Y_1$) and high frequency ($Y_2$) parts, as shown in FIG. 2. The high frequency part is frequency shifted by multiplying it by a suitable carrier frequency to produce the spectral band $Y_2'$ as shown in FIG. 3, and then highpass filtered to remove unwanted frequency components of lower frequency.

The chrominance is modulated in the usual way, and then highpass filtered to occupy the spectral band C shown in FIG. 2. The three components, low frequency luminance $Y_1$, modulated chrominance C and shifted high frequency luminance $Y_2'$ are then added together to produce the composite signal spectrum shown in FIG. 3.

The proposal can in principle be applied over any transmission system where the modulation bandwidth for conveying the signal can be extended beyond the conventional video bandwidth of about 5.5 MHz, for example in satellite broadcasting or in cable systems. The overall benefit obtained by new high-quality receivers designed for the system will depend on the bandwidth available and on certain other factors affecting noise levels and distortion, but a large improvement in picture resolution over conventional pictures is obtainable by transmitting signals up to a maximum frequency in the range 10 to 13 MHz.

Figure 3:
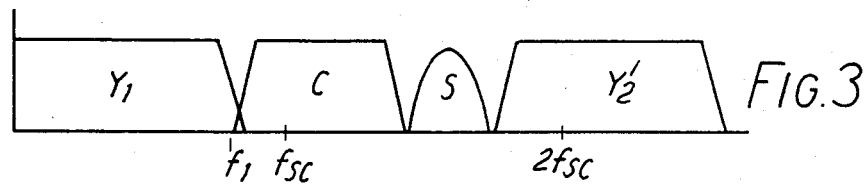
FIG. 3 shows the frequency spectrum of a colour television signal in accordance with this invention.

The spectrum of FIG. 3 also contains a signal S which can be a subcarrier to carry the sound transmission, preferably in a digital form. This can be fitted between the bands C and $Y_2'$.

One suitable and indeed preferred carrier frequency for frequency shifting the high frequency luminance is the PAL colour subcarrier frequency $f_{sc}$. The advantages of using this frequency are:

(i) it is readily available in both coder and receiver with known phase;
(ii) any carrier remaining in the demodulated signal has low visibility because the exact frequency of the colour subcarrier is chosen for minimum visibility; and
(iii) the use of only one carrier frequency precludes the possibility of intermodulation between two different carriers producing low-frequency beat patterns.

Other carrier frequencies would be possible, however, depending on the application, in particular frequencies which are related to the colour subcarrier frequency.

Figure 4:
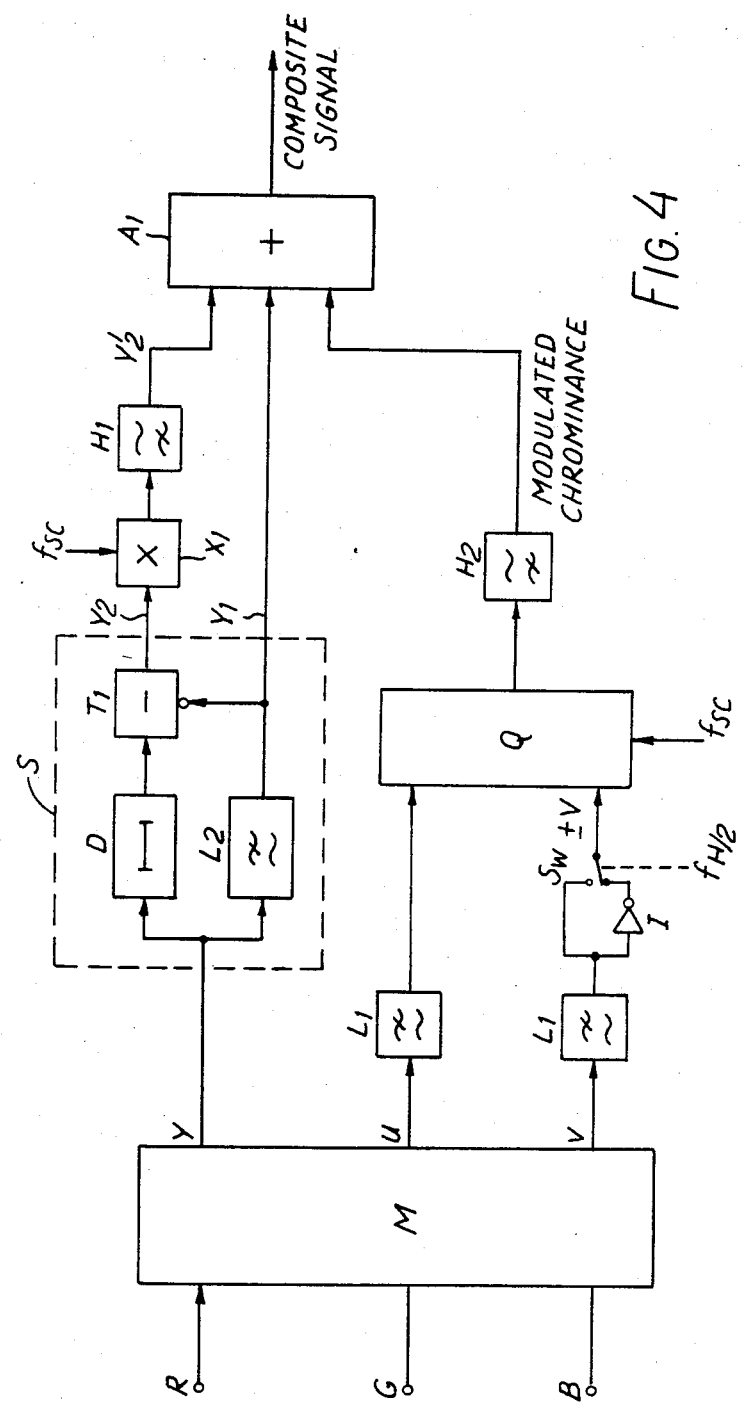
FIG. 4 is a block circuit diagram of a colour television transmitter embodying the invention.

FIG. 4 shows a block diagram of a coder embodying the invention.

In the system of FIG. 4, as in a conventional system, red, green and blue colour separation signals from a picture source, such as a television camera or a telecine machine, are converted in a linear matrix M to luminance Y and colour difference signals U and V. The colour difference signals are passed through lowpass filters $L_1$, the V signal is inverted on alternate lines by an inverter I and switch Sw, and both the U and V signals are quadrature modulated onto a subcarrier of frequency $f_{sc}$ by a quadrature modulator Q. In a conventional system, the lowpass filters $L_1$ will typically have a 3 dB bandwidth of 1.3 MHz; in the system of FIG. 4 the bandwidth may be higher, for example 1.8 MHz.

In a conventional coder, the modulated chrominance signals are added directly to the luminance signal Y, which may have been filtered by a notch filter centred on the colour subcarrier frequency.

In the system of FIG. 4, the luminance signal Y is split by a band-spitter, S, into a high-frequency part $Y_2$ and a low-frequency part $Y_1$. One possible form of the band-splitter S is shown in FIG. 4 which splits the signal into two complementary parts by means of a low-pass filter $L_2$ and a subtracter $T_1$ connected as shown. A compensating delay D is provided to compensate for the delay introduced by the low-pass filter $L_2$. The bandwidth of the lowpass filter $L_2$ may typically be 3.5 MHz.

In another possible implementation (not shown) the bandsplitter S may contain both a lowpass and a highpass filter, with passbands chosen so that the high-frequency part of the signal has a small frequency overlap with the low-frequency part; the shaping of the transition region would then be left to the receiver circuitry.

The high-frequency part of the signal is multiplied in a multiplier $X_1$ by a carrier, which is preferably the same frequency as the colour subcarrier frequency $f_{sc}$, as discussed above. This will generate sum and difference components from the carrier frequency and the input frequencies. The multiplied signal is highpass filtered in a filter $H_1$ to pass the sum frequencies but to reject the difference frequencies as well as any carrier or input frequency components. The effect of this processing is to frequency-shift the high frequency luminance by the carrier frequency, see FIG. 3.

The modulated chrominance signals may be highpass filtered as shown in FIG. 4 by a highpass filter $H_2$. This filter cuts off at the same frequency as the lowpass filter $L_2$ defining the low frequency part of the luminance signal and prevents crossluminance in the decoded signal.

The three components of the signal, namely, the modulated chrominance, the low-frequency luminance and the shifted high-frequency luminance are added together to produce the composite coded signal for transmission.

Two forms of decoding may be envisaged. If the signal is lowpass filtered to remove the shifted high-frequency luminance, the signal can be decoded in the normal way by a conventional receiver, to produce displayed signals of similar bandwidth to those from a conventionally coded signal, but without crosseffects. In practice the lowpass filtering would be accomplished by the effective lowpass filtering of the video signal in the receiver so that no additional circuitry is necessary.

Figure 5:
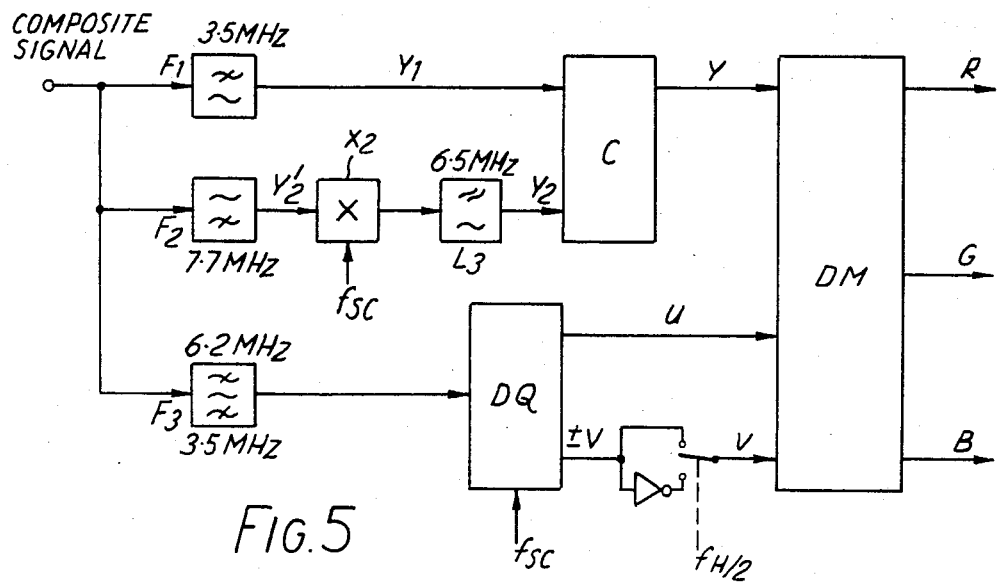
FIG. 5 is a block circuit diagram of a high-quality receiver embodying the invention.

However, a more sophisticated receiver, designed to display higher quality pictures can now be used. An example of such a receiver is shown in FIG. 5. The demodulated coded signal is split into three frequency bands corresponding to low-frequency luminance, shifted high-frequency luminance and modulated chrominance, by filters $F_1$, $F_2$ and $F_3$ respectively. The cut-off frequencies of these filters are shown on FIG. 5. The values shown for the filter bandwidths might be suitable for the case where the carrier frequency $f_C$ equals the PAL colour subcarrier frequency $f_{sc}$; other values would be possible. The shifted high frequency luminance is shifted back to its proper place by multiplying it by a sinewave signal of its carrier frequency $f_{sc}$ in a multiplier $X_2$ and lowpass filtering to remove unwanted components in a filter $L_3$. The signal components $Y_1$ and $Y_2$ are combined in a combining unit C to re-form the wideband luminance signal Y. The combiner C may consist of a simple adding network, or the combiner of FIG. 6 may be used (see below) in which case the lowpass filter $F_1$ in FIG. 5 can be omitted. The chrominance signals are demodulated in quadrature in a demodulator DQ in the usual way and matrixed in a matrix DM with the luminance signal to give red, green and blue colour separation signals to drive the receiver display.

With the example of FIG. 5, a digital sound carrier centred on about 7 MHz and with a bandwidth of about 1.5 MHz can be transmitted.

Figure 6:
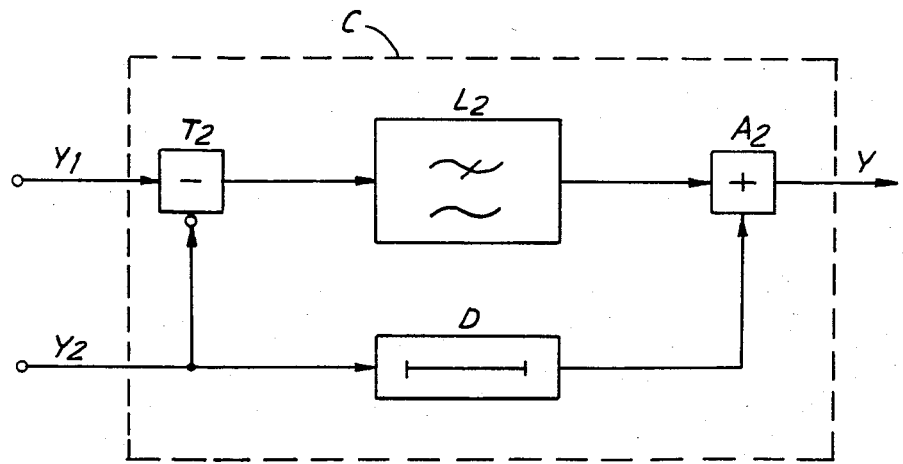
FIG. 6 illustrates an improvement to the receiver of FIG. 5.

The combining circuit shown in FIG. 6 includes a lowpass filter $L_2$, a subtractor $T_2$ and an adder $A_2$ connected as shown. The lowpass filter $L_2$ takes over the function of the filter $F_1$ in FIG. 5. This circuit removes low frequency components present in the signal $Y_2$.

It is worth noting that in the system of FIGS. 4 and 5, to allow complete separation of chrominance and luminance in a high-quality receiver it is necessary to restrict the lower sideband of the modulated chrominance signal, as by the filter $H_2$. Any modulated chrominance that extends below the cutoff frequency of the luminance lowpass filter $L_2$ would cause cross-luminance in the high-quality receiver. However, depending on the values chosen for the luminance l.p.f. cutoff and the h.f. luminance carrier frequency, it may be possible to transmit more of the upper sideband of the modulated chrominance than is conventional. This would give single sideband h.f. chrominance in the high quality receiver. This would result in U-V crosstalk in the high frequency part of the demodulated chrominance signal though this is probably not a serious impairment.

In satellite broadcasting there could still be problems with noise because of the triangular spectrum of f.m. noise. But the noise would be in h.f. luminance rather than l.f. chrominance, and would therefore be less visible. A bigger dish aerial would give a better signal-to-noise ratio.

Successful joining up of the low frequency and high frequency luminance signals depends on the correct phase of the demodulating subcarrier. A phase error of 18° would lead to a group delay error of about 10 ns at 5 MHz. Manufacturers suggest that in modern receivers sub-carrier phase can be kept within 15°, so errors from this source should be negligible.

In addition to its possible uses for satellite broadcasting and cable television, the system has other applications. A possible application is for broadcasters as a halfway stage between present composite PAL signals and the future when digital component signals will be used. In this application, compatibility is particularly important. The other advantages of the system are that it can be 'perfectly' decoded to components without "PAL footprints" and that it can be recorded on at least some existing videotape recorders.

I claim:

1. A colour television encoder, comprising:
   input means for receiving luminance and chrominance input signals;
   means for separating out high-frequency luminance components of the luminance signal;
   means for modulating the chrominance signal onto a subcarrier so that the modulated chrominance components fall in the frequency range of the high-frequency luminance components; and
   means for frequency shifting the separated high frequency luminance components to above the frequency band of the modulated chrominance components,
   said frequency shifting means comprising means for multiplying said separated high frequency luminance components by a constant frequency signal to generate sum and difference frequency signals, and means for selecting the sum signal as the frequency-shifted high frequency luminance component.

2. An encoder according to claim 1, including highpass filtering means for removing low-frequency components from the modulated chrominance signal.

3. An encoder according to claim 1, in which the separating means cancels out all high-frequency luminance components from the high-frequency luminance frequency band in the luminance signal.

4. An encoder according to claim 1, in which the frequency shifting means shifts the high-frequency luminance components by an amount substantially equal to the colour subcarrier frequency or a frequency related thereto.

5. An encoder according to claim 4, in which said separating means comprises band pass filter means providing a first separated output and subtractor means for subtracting the first separated output from the luminance input signal to provide a second separated output.

6. A colour television decoder, comprising means for receiving an input signal and for separating out three successive frequency bands of which the first is the lowest and the third is the highest; means for frequency-shifting the signals in the third band into the frequency range of the second band and for combining the resultant with the signal in the first band to produce a luminance signal, said frequency-shifting means comprising means for multiplying the third band by a constant frequency signal of frequency below said third band to generate sum and difference frequency signals, and means for selecting the difference signal as said resultant; and
   means for demodulating the received signal in the second band to provide a chrominance signal.

7. A decoder according to claim 6, in which the frequency-shifting means shifts the third signal by an amount substantially equal to the colour subcarrier frequency.

8. A colour television signal comprising low frequency luminance components in a first frequency band, at least modulated chrominance components in a second frequency band above the low frequency luminance components, and frequency-shifted high-frequency luminance components in a third frequency band above the modulated chrominance components, the highest frequency luminance frequency components being at the high frequency end of the third band.

9. A signal according to claim 8, in which the second frequency band contains no high frequency luminance components.

10. A colour television receiver, comprising means for receiving a colour television signal comprising low frequency luminance components and high frequency luminance components in a frequency band spaced above the low-frequency luminance components;
    means for frequency shifting high-frequency luminance components in said signal down in frequency such as to be contiguous in frequency with the low frequency luminance components, said frequency shifting means comprising means for multiplying said high frequency components by a constant frequency signal of frequency below the frequency of said high frequency components in said received colour television signal to generate sum and difference signals, and means for selecting the difference signal; and
    means for recombining said shifted components with the low-frequency luminance components to provide a luminance signal for display.

11. A colour television encoder, comprising:

input means for receiving luminance and chrominance input signals;

means for separating out high-frequency luminance components of the luminance signal;

means for modulating the chrominance signal onto a subcarrier so that the modulated chrominance components fall in the frequency range of the high-frequency luminance components; and means for frequency shifting the separated high frequency luminance components to above the frequency band of the modulated chrominance components, said frequency shifting means shifting the high-frequency luminance components by an amount substantially equal to the colour subcarrier frequency.

12. An encoder according to claim 11, including high-pass filtering means for removing low-frequency components from the modulated chrominance signal.

13. An encoder according to claim 11, in which the separating means cancels out all high-frequency luminance components from the high-frequency luminance frequency band in the luminance signal.

14. A colour television decoder, comprising:
means for receiving an input signal and for separating out three successive frequency bands of which the first is the lowest and the third is the highest;

means for frequency-shifting the signals in the third band into the frequency range of the second band and for combining the resultant with the signal in the first band to produce a luminance signal, said frequency-shifting means shifting the third signal by an amount substantially equal to the colour subcarrier frequency; and means for demodulating the received signal in the second band to provide a chrominance signal.

15. A colour television signal comprising low frequency luminance components in a first frequency band, at least modulated chrominance components in a second frequency band above the low frequency luminance components, and frequency-shifted high-frequency luminance components in a third frequency band shifted above the modulated chrominance components by an amount substantially equal to the chrominance subcarrier frequency.

16. A signal according to claim 15, in which the second frequency band contains no high frequency luminance components.

17. A colour television receiver, comprising:
means for receiving a colour television signal comprising low frequency luminance components and high frequency luminance components in a frequency band spaced above the low-frequency luminance components;

means for frequency shifting high-frequency luminance components in said signal down in frequency by an amount substantially equal to the chromiunance sub-carrier frequency such as to be contiguous in frequency with the low frequency luminance components; and means for recombining said shifted components with the low-frequency luminance components to provide a luminance signal for display.

18. A colour television encoder, comprising:
input means for receiving luminance and chrominance input signals;

means for separating out high-frequency luminance components of the luminance signal, said separating means comprising band pass filter means providing a first separated output, and subtractor means for subtracting the first separated output from the luminance input signal to provide a second separated output;

means for modulating the chrominance signal onto a subcarrier so that the modulated chrominance components fall in the frequency range of the high-frequency luminance components; and means for frequency shifting the separated high frequency luminance components to above the frequency band of the modulated chrominance components.

19. An encoder according to claim 18, including high-pass filtering means for removing low-frequency components from the modulated chrominance signal.

20. An encoder according to claim 18, in which the frequency shifting means shifts the high-frequency luminance components by an amount substantially equal to the colour subcarrier frequency or a frequency related thereto.

21. A colour television decoder, comprising:
means for receiving an input signal;

means coupled to the input means for separating out three successive frequency bands of which the first is the lowest and the third is the highest;

means for frequency shifting the signals in the third band into the frequency range of the second band;

means for combining the resultant with the signal in the first band to produce a luminance signal, said combining means comprising first and second input terminals, a subtractor having its non-inverting input connected to said first input terminal and its inverting input connected to said input terminal, band-pass filter means connected to the output of said subtractor, and adder means connected to the output of said band-pass filter means and said second input terminal to provide said luminance signal; and means for demodulating the received signal in the second band to provide a chrominance signal.

22. A decoder according to claim 21, in which the frequency-shifting means shifts the third signal by an amount substantially equal to the colour subcarrier frequency.

23. A colour television receiver, comprising:
means for receiving a colour television signal comprising low frequency luminance components and high frequency luminance components in a frequency band spaced above the low-frequency luminance components;

means for frequency shifting high-frequency luminance components in said signal down in frequence such as to be contiguous in frequency with the low frequency luminance components; and means for recombining said shifted components with the low-frequency luminance components to provide a luminance signal for display, said recombining means comprising first and second input terminals, a subtractor having its non-inverting input connected to said first input terminal and its inverting input connected to said input terminal, band-pass filter means connected to the output of said subtractor and adder means connected to the output of said band-pass filter means and said second input terminal to provide said luminance signal.

* * * * *